3,162,541
METHOD OF COLORING FOODS AND OTHER MATERIALS AND THE RESULTING PRODUCT
Orlando A. Battista, Drexel Hill, Pa., assignor, by mesne assignments, to FMC Corporation, San Jose, Calif., a corporation of Delaware
No Drawing. Filed July 3, 1961, Ser. No. 121,302
6 Claims. (Cl. 106—165)

This invention relates to artifically colored materials, particularly edibles but also including non-edibles, and to a means for coloring the same.

Heretofore in the case of artifically colored foods, the coloring is usually done by means of aqueous solutions of the color agent. Where water cannot be tolerated in the food, a color solution is made with a non-aqueous solvent like glycerine, propylene glycol, or alcohol; and in some cases an emulsifying agent such as lecithin may have to be added to the solution. Sometimes it is necessary to use a lake, comprising an insoluble pigment, to color a food where soluble colors are not satisfactory. Frequently, too, non-aqueous pastes are used comprising, for example, powdered color, glycerine and powdered sugar. As may be apparent, the water content of a food often appears to govern the preparation or form of the color agent. It would be desirable and certainly convenient if a single color agent preparation could be employed in all cases, at least for all solid foods or a majority of them. To this end the invention is addressed.

As will become apparent, the invention makes it possible to dispense with the variety of diluents or carriers heretofore used for preparing and using color agents. In addition, the invention provides for the more uniform coloring of, and improved color retention in, the material to be colored. In the preparation of the color agent itself, it may permit certain drying procedures to be shortened and may reduce problems arising from the use of hard water. In other instances, hydrophobic materials, such as polyolefin and other hydrophobic polymers, may be colored with a greater range of colors and by means of a more simplified procedure without introducing harmful diluents or carriers.

Other advantages will become apparent from the ensuing description.

According to the invention it is proped to bind a suitable color by means of cellulose crystallite aggregates and then to incorporate the resulting mix or pre-mix in the colorable material. The aggregates, which are described below in detail, are employed in finely divided form, in either the dry or wet state, and act to hold the color; they may be of such small particle sizes, well below the limits of discrimination by the unaided eye, that by means of thorough mixing a colored product is obtained having an optically uniform appearance. The product has properties not otherwise changed from its prior state, i.e., before addition of the pre-mix.

The terms "color," "color agent," and "coloring matter" include both synthetic and natural dyes, and also pigments and lakes.

Besides being available in very small particle sizes, the aggregates are characterized by their high purity and are in fact the most pure form of cellulose presently available. They are bland in taste and odor, white in color, physically resemble starch, are edible but not nutritious, and are insoluble in water but easily dispersible therein. Their bland taste is noteworthy, in contrast to the sweet or salt taste of conventional diluents like sugar or salt. The resulting colored products are characterized by their good color retention. The aggregates dispersed throughout the product hold the color by sorptive forces, i.e., by both absorptive and adsorptive forces. The products do not exhibit blooming, streaking, color migration or bleeding. Blooming refers to the appearance of detectable spots of concentrated color; streaking is the tendency of an individual color, present in a dry blend of colors, to streak through a liquid in which the blend is being dissolved; color migration or bleeding is the tendency of a color to transfer from one area into an adjacent area not desired to be colored. These phenomena are evidence that the colors are not well retained.

As will be apparent, in the above-described aggregates-color mix or pre-mix, the aggregates dilute the color, and, in view of the small amount of color usually employed, this means that handling losses of color are reduced. While it is conventional to dilute a color to reduce losses, the diluents heretofore employed have their disadvantages. Thus, water cannot be used where the color is intended for foods or other materials that do not tolerate water; organic solvents like glycerine, besides being expensive, give solutions which are difficult to filter; propylene glycol frequently dissolves insufficient color than is required; alcohol (95%) has an even more limited solubility range; sugar and salt may not be desirable in many foods; use of lecithin represents an added expense, and, owing to the different types available, requires experimentation; lakes may show the presence of individual color particles, especially with light shades, and of course they introduce heavy metals like aluminum and calcium into the food; and color pastes require careful preparation, sometimes only partially dissolving the color and being impractical in small scale work.

The aggregate-color mixes of the invention are capable of avoiding such disadvantages as the foregoing.

Conventionally, during the process of manufacturing synthetic colors, such as the coal tar dyes, they are subjected to a drying step to reduce the moisture content below about 10% by weight and usually below about 5%. Use of the aggregates to form mixes with these synthetics may make it unnecessary to dry the colors as extensively as otherwise because the aggregates are capable of forming apparently dry free-flowing mixes with wet colors, i.e., colors containing much more than 10% of water. In many instances, too, the mixes can be further dried, if desired, by simply spreading them out to dry in air at room temperature. The good sorptive capacity of the aggregates for the color minimizes or avoids any color dust problem.

The mixes may also minimize the problem heretofore encountered when it is sought to prepare aqueous color solutions by dissolving the color in hard water. The presence of calcium and magnesium ions in the water tend to form insoluble calcium and magnesium salts of some colors, and such salts then appear as sediment in the solution. The present mixes may avoid the use of water altogether, or it may be present in such small amounts that hardness is not a factor.

Of further interest is the fact that the aggregates-color mixes, being granular or powdered, are easily handled and poured, and are dust free.

Considering the invention in more detail, it may be noted that the cellulose crystallite aggregates, together with their properties and the manner of obtaining them, are described at length in the copending application of O. A. Battista, Ser. No. 33,941, filed June 6, 1960. For conveinence, a brief description of them follows, it being understood that the said application may be consulted for a more complete disclosure. The aggregates are productions of the controlled acid hydrolysis of cellulose, there being formed an acid-soluble portion and an acid-insoluble portion. The latter comprises a crystalline residue or remanider which is water washed and recovered, being referred to as cellulose crystallite aggregates, or as level-off D.P. (degree of polymerization) cellulose. These aggregates, in the state resulting from the hydrolysis and washing steps, in which state they may be designated as-formed aggregates, may be subjected to mechanical disintegration or attrition, as described below.

In the acid hydrolysis, the acid destroys or removes amorphous portions of the original cellulose chains, the remaining unattacked portions being in a participate, non-fibrous or crystalline form as a result of the disruption of the continuity of the fine structures between crystalline and amorphous regions of the original cellulose. Although hydrolysis may be effected by various specific methods, including the use of various acids, a direct method which is free of secondary reactions comprises the treatment of the original cellulosic material with 2.5 normal hydrochloric acid solution for 15 minutes at boiling temperature.

The cellulose undergoing the hydrolysis reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

It may be observed that "crystallite," as used herein, is a cluster of longitudinally disposed, closely packed cellulose chains or molecules, and that "aggregates" are clusters of crystallites. The aggregates may also be said to comprise straight, rigid, relatively non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average chain length, or of average level-off D.P. values.

The hydrolysis methods noted are particularly characterized in that in each crystallite aggregate resulting from the hydrolysis, no constituent chain is connected to a chain in a neighboring aggregate; rather, all the chains in an aggregate are separate from and free of those in neighboring aggregates.

The aggregates suitable for use in the invention are characterized by having a preferred average level-off D.P. of 125 to 375, or even 200 to 300, anhydroglucose units. Preferred sources for making such material include cotton linters and wood pulp having a high alpha-cellulose content. Other suitable aggregates may have lower average level-off D.P. values, say in the range of 60 to 125, or even 15 to 60. Crystallite aggregates in the 60 to 125 range are obtainable from the acid hydrolysis of alkali swollen natural forms of cellulose, of which a preferred source is cellulose that has been mercerized by treatment with 18% caustic soda solution at 20° C. for two hours. Aggregates in the 15 to 60 range are suitably prepared from regenerated forms of cellulose, including tire and textile yarns, other regenerated cellulose fibers, and cellophane.

In every case the cellulosic source material has a D.P. greater than the level-off D.P. thereof.

Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m. (parts per million), although ash may range from about 10 to about 400 or 500 or 600 p.p.m. By comparison, conventional fibrous cellulose may have 1000 to 4000 p.p.m. of ash.

In their as-formed state, the aggregates in the over-all average level-off D.P. range of 15 to 375 are in a loosely aggregated state and, particularly in the larger particle sizes, say from 40 to 250 or 300 microns, are characterized by the presence of many cracks in their surfaces, including similar surface irregularities like pores, depressions, voids, fissures, and notches. Because of such irregularities, the apparent or bulk density of the aggregates is much less than their absolute density. In terms of lbs. per cu. ft., the bulk density of the aggregates may range from 7 or 8 to about 34 or 35 lbs. per cu. ft.

The as-formed aggregates are further characterized by having a particle size in the over-all range of 1 or 2 to 250 to 300 microns, as determined visibly by microscopic examination. By subjecting them to mechanical disintegration, there is produced a material having a size in the over-all range of less than 1 to about 250 or 300 microns, and as will be understood, the proportions of material in the lower size ranges will be increased over those of the non-disintegrated aggregates. It will also be understood that the particle size and size distribution may be selected to suit a particular use. The aggregates in the lower size ranges, particularly those having a size of up to 1 micron, are believed to be responsible for the formation of stable homogeneous suspensions.

Mechanical disintegration of the aggregates, if carried out, and preferably it is, may be done in several ways, as by subjecting them to attrition in a mill, or to a high speed cutting action, or to the action of high pressures on the order of at least 5,000 or 10,000 p.s.i. The disintegration is preferably carried out in the presence of an aqueous medium. Whatever method is used, the disintegration is extensive enough so that the resulting disintegrated aggregates are characterized by forming a stable suspension in the aqueous medium in which they are being attributed, or in which they may be subsequently dispersed. By a stable suspension is meant one from which the aggregates will not settle out but will remain suspended indefinitely, even for periods measured in terms of weeks or months. At lower concentrations of aggregates, the suspension is a dispersion, while at higher concentrations it is a gel. It is thought that stable suspensions result from the presence therein of at least 1% by weight of aggregates having a particle size of up to one micron.

Either before or after mechanical disintegration, the aggregates may be dried.

For producing the dried aggregates a number of drying procedures are available, including freeze drying, spray drying, drum drying, and drying by solvent displacement, which are preferred procedures.

If desired, the aggregates may be fractionated to obtain fractions of more uniform particle sizes. Fractionation may be accomplished by means of such separation procedures as mechanical sifting, settling in water, or centrifuging, a number of useful fractions being obtainable, including fractions having a particle size of up to 0.2, 1, 2, 5, 10, 40, 50, 100, etc. microns.

Water is a preferred medium in which to disintegrate the crystallite aggregates. Other suitable media are aqueous mixtures comprising water and one or more water-miscible oxygen-containing, preferably hydroxy- and/or carbonyl-containing, compounds. Hydroxy compounds are a preferred class, particularly polyols, comprising aliphatic compounds having two or more hydroxy groups, of which glycerol is an example.

Turning to the color agents, the useful and preferred colors for foods are the certified food colors of the FD & C series, including Red Nos. 1, 2, 3, and 4, Green Nos. 1, 2, and 3, Blue Nos. 1 and 2, Violet No. 1, and Yellow Nos. 5 and 6. All of the foregoing are water soluble synthetic coal tar dyes. They are useful per se as primary colors and in various blends as secondary and tertiary colors.

Other useful dyes are water soluble natural organic coloring matters, preferably of plant or vegetable origin, including such dyes as beet juice, brazilwood, caramel, carminic acid, litmus, logwood, orchil, safflower and saffron.

The aggregates-color mixes are suitably prepared by direct mixing. If desired, the color may first be dissolved in water, or an alcohol and water solution, before or during the step of mixing it with the dry aggregates, although it can also be mixed in the dry state. It is useful to stir the color agent while gradually adding the aggregates thereto. During such stirring operation in the presence of a suitable amount of liquid, the mixture usually assumes the form of a dough, after which it breaks up, forming apparently dry, free-flowing granules. Such granules form even though more liquid than solids are present in the mix being stirred. The resulting mix is stable, even at room temperatures, although if desired it may be kept under refrigeration until needed. The mix is not mechanically separable into its components. It is thought that the color, and also any liquid present, is held by the aggregates by sorptive forces, that is, both absorptive and adsorptive forces, and that the color is thus protected against loss. The color mix will, of course, contain more or less water depending on whether the initial color is in solution or dry; in other words, the water content of the mix is proportional to that in the original color. In this connection, it is possible to subject the color mixes to mild dehydration conditions and thus obtain an even dryer mix, if it is so desired. Of interest is the fact that the dry color mixes are convertible to spreads by the addition of a suitable amount of liquid like water or milk, such amount being easily determinable in a particular case and being dependent on the mix and the desired consistency of the spread.

The dry or dissolved color may also be mixed with an aqueous dispersion of the aggregates, and the resulting mixture used per se or after removal of the water.

Another suitable method comprises attriting the aggregates in an aqueous solution of the color to produce a colored gel; or the color, in solution or powdered form, may be added to the already prepared gel; or the dry aggregates-color mix may be attrited in water to the gel form; in any case, the wet colored gel is then ready to be dispersed in the food. If the latter contains or tolerates much water, the wet, colored gel may be incorporated therein directly; otherwise, the gel may first be dried to any suitable water concentration level. Spray drying, drum drying, air or oven drying, or other suitable drying operation may be employed to reduce the water content of the color mixes. As will be understood, any of the foregoing mixes may be distributed per se to food processors for use in coloring food. Owing to the excellent compressibility of the aggregates, the dry or nearly dry mixes may be compressed to a desired shape, say tablets, using pressures of up to 5000 p.s.i. or more.

Food material may be colored by mixing in the aggregates-color mix in any desired way, using means conventionally employed for incorporating dry or nearly dry ingredients in a food material. For example, in ice cream manufacture the color may be added as late in the process as suitably possible; in extruded breakfast cereals it can be added prior to extrusion of the cereal mix; in baked goods manufacture is is added to the dough; in beverage making, color is conveniently mixed in with the syrup.

As indicated, the colorable materials are preferably foods, including any artificially colorable food, or any food capable of being benefited by being colored, but preferably foods that are conventionally colored. Non-fat or low fat foods are preferred, and these may be defined as having less than 3 to 5% by weight of fat, less preferably less than 10%. The invention is broadly applicable to any food as so defined, or any food composition, food ingredient, or food product, whether comprised of one or more ingredients, whether liquid, liquid-containing, or solid, whether edible per se or requiring preliminary conventional steps like cooking, mixing, cooling, mechanical treatment, and the like.

Specific low fat or non-fat foods include dairy products like buttermilk, cottage cheese, non-fat fluid milk, non-fat milk solids, sherbet, ices, and the like; fruits such as berries, melons, citrus fruit, fruit juices, fruit beverages, and substantially all tree and vine fruits; grains and grain products including substantially all breakfast cereals; flours, meals and other farinaceous materials; baked and cooked products such as breads, angel food cake, macaroni, egg noodles, spaghetti, pretzels, etc.; dry packaged pet foods; also certain confections such as hard candy, fondant, marshmallows, honey, chocolate syrup, jams, jellies, and marmalades, molasses, sugar, icings, and the like; also vegetables including all roots and tubers, all leaf and stem vegetables, and substantially all flower, fruit, and seed vegetables. Miscellaneous other foods include gelatin dessert mixes, toppings, dressings, spreads, dips, pie mixes, egg white, certain soups and gravies, and the like. Most of the foregoing foods have a high water content, usually in excess of 50% by weight of the food, the exceptions being the non-fat milk solids, breakfast cereals, flours and meals, macaroni, pretzels, candy, sugar. Foods having a high water content, say in excess of 50, 60, or 70% by weight, are a preferred group owing to the unusually good dispersibility of the aggregates in water.

The aggregates-color mixes are capable of making natural foods look more attractive and appealing by supplementing their color; for example, the addition of an appropriately colored mix to pea soup or pea soup concentrate may intensify its natural hue and increase consumer acceptance of the same over a weakly colored soup; at the same time the aggregates may add a desirable thickness to the soup. Other soups may similarly be improved. In bakeries, the dry color mixes may replace aqueous solutions of dyes and thus afford a processing advantage. Meats and meat products may be given a desirably brighter red color by means of an aggregates-paprika mix, the paprika, though classified as a spice, serving to impart color.

In foods that tolerate little or no water, such as hard candies, bakery and confectionery coatings or icings, angel food cake mixes, beverage powders, gelatin desserts, and the like, the color mixes may be used to advantage as their water content may be varied as desired down to zero water. In some foods, of which convenience foods like dry mixes are a conspicuous example, liquid color solutions are impractical to use, and solid diluents like sugar or salt may be undesirable for their addition to the taste of the food. In such cases aggregates-color mixes are of value; furthermore, they are not apt to allow the color to transfer to the walls of the paper or other container in which the dry food mixes are usually packaged; and they may reduce the tendency of a color to streak while the food mix is dissolving in water or milk or other edible liquid.

Jellies, jams, and marmalades may be satisfactorily colored and a degree of opacity imparted thereto which may be varied by varying the quantity of the aggregates in the mixes.

In the case of beverages it is conventional practice to mix the flavor and the color, and to handle or ship the resulting composition to the bottler. Aggregate-color mixes lend themselves to this procedure as flavors can easily be incorporated in them to give apparently dry free-flowing mixtures which can be added to the beverage syrup. Light-affected, acid-precipitatable, and bitter-tasting colors are of course to be avoided. Desirable cloud may coincidentally be added to the beverage in the form of the aggregates owing to their good dispersibility in water and stability in the dispersed state.

Attractive effects may be obtained in candy by means of the color mixes. For example, interesting speckled patterns may be produced in coated candies such as jelly beans by using two or more differently colored mixes. Similar effects may be produced in toppings and icings.

The use of sugar in conventional sugar-dye mixtures to color dry powdered gelatin desserts may be eliminated by the aggregates-color mixes; not only are the aggregates non-nutritive, in contrast to the high calorie content of sugar, and better able to retain the color, but also they may impart desirable opaqueness to the gelatin to give interesting variations of this popular dessert.

The color concentration in the food is conventional, generally ranging from as low as 0.0015 up to 0.002, 0.007, 0.03, or 0.05% by weight. The color concentration may be even higher, say to 0.1, 0.5, or 1.0%, but ordinarily there is no advantage in concentrations above 0.05 or 0.1%. The amount of crystallite aggregates incorporated in the food is also variable, depending on the particular food, the desired depth of shade, etc., but in general may be as low as 0.1% or as high as 90% by weight, or more; more usually the amount may range from 1 to 5, 10, 20, or 30% by weight, based on the food. On the basis of the aggregates, the color concentration may be as low as 0.0002% and as high as 50% by weight, but usually is about 0.001 to 1.0%, and more preferably 0.005 to 0.5%.

Water-insoluble colors in the above concentrations may also be used to color the foregoing foods. For this purpose oil-soluble or alcohol-soluble natural colors are useful and may include carotene, chlorophyll, alkanet, cocoa red, fustic, madder, and tumeric. Other natural colors are annatto, indigo, Persian berries, sanderswood, quercitron bark.

The foregoing dyes, both water soluble and water insoluble, are of value for coloring fatty foods such as cheese, cream, butter, ice cream, and other similar dairy products; also margarine, shortenings, cooking oil, vegetable oils, hydrogenated fats and oils, lard, mayonnaise, salad dressing, and other fats and oils including essential oils; baked goods such as cookies, crackers, doughnuts, fruit cake, pie crust, ice cream cones; also dried egg yolk and whole egg; and snacks like popcorn, potato chips. For these fat-containing foods having more than 5 or 10% and preferably more than 20 or 30% fat by weight, it may be desirable to disperse the aggregates-color mix in a suitable oily carrier before addition to the food. Such a step may facilitate obtaining good mixing and distribution of the color mix in the food. The oily carrier is preferably a natural constituent of the food, or at least a desirable non-injurious component of the resulting colored product. In fat-containing foods of lower fat content, the previously described procedures may be used.

If it is desired to employ insoluble colors, such as a certified FD & C lake or a natural dye or pigment to color a food, the aggregates may serve as a bland inert diluent therefor, making it easier to handle and weigh the color and reduce losses. Natural pigments may include carbon black, charcoal, iron oxides, titanium dioxide, ultramarine blue, chrome oxide greens, etc.

In some cases, particularly where relatively larger amounts of aggregates are used, it may be desirable to incorporate with the aggregates-color mix a small amount of an edible protective colloid to vary the texture or mouth feel of the resulting food product. The amount of such colloid may range from 0.1 to about 5%, preferably 0.1 to 2 or 3% by weight of the color mix, and the colloid may be chosen from conventional materials such as gums, including carrageenin, tragacanth, arabic, ghatti, and karaya gums; seaweed colloids such as agar, carrageen and sodium alginate; seed extracts such as locust bean, quince and guar; starches and starch derivatives, like converted starches; water-dispersible cellulose derivatives such sodium carboxymethyl-cellulose; pectins; also propylene glycol alginate, glycerol, and stearic acid mono- and di-glycerides.

As indicated, non-food articles or materials may be advantageously colored by the color mixes. Where such non-foods come into contact with foods, as in the case of food packaging materials, a food color is used; otherwise non-food colors such as those of the D & C and Ext. D & C series, or other suitable colors are employed, although food colors may be used if desired. Food packaging materials may include paper, paperboard, film, foil, printing inks, etc. To select a suitable color for a given non-food, conventional practice may be reviewed, or the Color Index may be consulted.

Other non-foods are plastics, and also molding compositions comprising a resin and a filler, in which applications the mixes may provide non-blooming color shades. Pastel shades may be obtained with clear plastics such as urea-formaldehyde and acrylics. The aggregates themselves may be used as filler, as described in copending application Serial No. 23,377, filed April 20, 1960, and may be mixed with the color agent prior to such use.

Dry water-dispersible mixes comprising the aggregates and an anti-reaggregating barrier agent, as described in copending application Serial No. 103,240, filed April 17, 1961, now abandoned may be colored by the color mixes, or the aggregates component of the dry water-dispersible mixes may be employed to introduce the color thereto.

The color mixes may be used to dye fibers, films, and other products of fiber-forming hydrophobic polymers, such as polyolefins like polyethylene and polypropylene, also polyamides, polyesters, polyvinylidene chloride, polyacrylonitrile, polyacrylics, etc. The color mixes may be incorporated in the polymer prior to extrusion into fibers and films, for which purpose the amount of aggregates may be about 0.1 to 0.5 or 1% by weight of the polymer. By using aggregates of very fine particle size, say less than 10, 5, 2, or 1 micron, any effect of the aggregates on the physical properties of the fiber or film is minimized. An important advantage of such use of the color mixes is that water-soluble direct dyes of the type normally used to color rayons, as well as water-insoluble dyes, may be employed. While hydrophobic polymers may not normally be colored by means of water-soluble colors, the use of the color mixes will permit water-soluble colors to be used because of the good sorptive power of the aggregates for the colors. Water soluble colors, of course, are easier to use than the indirect water-insoluble colors and do not involve lake formations; furthermore, the deleterious effect of many oil solvents for the water insoluble colors is avoided. Other hydrophobic polymers, not necessarily fiber-forming, that may be colored by means of the mixes include polymers of butadiene, styrene, isoprene; also butadiene-diene copolymers, and the like.

Viscose spinning solutions may be colored by addition of the color mix prior to spinning.

It will be understood that in the case of non-food articles and materials, the invention generally provides the advantages noted for the foods.

The prepartion of a color mix may be illustrated by the following example.

*Example 1*

Cellulose crystallite aggregates were prepared by hydrolyzing Ketchikan sulfite wood pulp with 0.5% by weight of HCl for 60 minutes at 250° F. After washing, the aggregates were spray dried to give a dry powder having a moisture content of 4 to 5% by weight, an average level-off D.P. of 220, and a particle size ranging from 1 to 250 or 300 microns.

A color solvent was prepared by mixing 50 g. of ethanol with 50 g. of water, and to this about 0.5 g. of water soluble FD & C Yellow No. 6 was added, with stirring until dissolved. The solution was placed in a Model N–50 Hobart mixer and to it there was slowly added, with constant stirring, 75 g. of the above described crystallite aggregates. In due course a paste formed, and as the content of the aggregates was slowly increased, the mixture began to stiffen, gradually forming a dough, after which it began to break up, forming granules. With increasing concentration of the aggregates the size of the granules became progressively smaller, and when the point was reached at which the mixture was considered to be in an apparently dry, free-flowing form, it comprised particles having a diameter of 1 to 2 millimeters. About 5 to 10 minutes were required to convert the mixture to a freely flowable, brightly colored, apparently dry mass or crumb containing about 42% by weight of the aggregates, and the balance water and ethanol. The color mix, after removal of the ethanol, was considered to be suitable for coloring high water, low fat foods such as noodles, spaghetti, angel food and sponge cakes, corn bread, etc. By spreading the crumb out and permitting it to dry at room temperature, the aggregates content of the mix could be raised to any desired level.

It is to be understood that what is primarily meant by referring to the color mix as apparently or substantially dry is that it has a discontinuous, particulate form such as to be freely flowable, and that the drying step is achieved, at least in part, by virtue of the absorption and/or adsorption of the dissolved color on the cellulose crystallite aggregates.

Although the invention has been described in connection with specific embodiments of the same, it will be understood that it is capable of obvious variations without departing from its scope.

In the light of the foregoing description, the following is claimed:

1. A uniformly colored material having uniformly distributed therethrough level-off D.P. cellulose crystallite aggregates having an average level-off D.P. of 15 to 375 in finely divided form having particle sizes below the limits of discrimination by the unaided eye, said aggregates uniformly carrying a coloring material.

2. A uniformly colored material having uniformly distributed therethrough level-off D.P. cellulose crystallite aggregates having an average level-off D.P. of 15 to 375 in finely divided form having particle sizes below the limits of discrimination by the unaided eye, said aggregates uniformly carrying a water-soluble coloring material.

3. A uniformly colored material having uniformly distributed therethrough level-off D.P. cellulose crystallite agregates having an average level-off D.P. of 15 to 375 in finely divided form having particle sizes below the limits of discrimination by the unaided eye, said aggregates uniformly carrying an oil-soluble coloring material.

4. A uniformly colored material having uniformly distributed therethrough level-off D.P. cellulose crystallite aggregates having an average level-off D.P. of 15 to 375 in finely divided form having particle sizes below the limits of discrimination by the unaided eye, at least one percent of said aggregates having a particle size up to one micron, said aggregates uniformly carrying a coloring material.

5. A method of uniformly coloring a material comprising uniformly associating a color agent with level-off D.P. cellulose crystallite aggregates having an average level-off D.P. of 15 to 375 in finely divided form having particle sizes below the limits of discrimination by the human unaided eye, then uniformly incorporating the colored cellulose crystallite aggregates into the material to be colored.

6. A method of uniformly coloring a material comprising uniformly associating a color agent with level-off D.P. cellulose crystallite aggregates having an average level-off D.P. of 15 to 375 in finely divided form having particle sizes below the limits of discrimination by the human unaided eye, at least one percent of said aggregates having a particle size up to one micron, then uniformly incorporating the colored cellulose crystalline aggregates into the material to be colored.

References Cited in the file of this patent

UNITED STATES PATENTS

| | | |
|---|---|---|
| 1,729,590 | Morris | Sept. 24, 1929 |
| 1,783,154 | Schaub | Nov. 25, 1930 |
| 2,607,697 | Brown | Aug. 19, 1952 |

OTHER REFERENCES

"Crops in Peace and War," The Yearbook of Agriculture, 1950–1951, pp. 793–797.